United States Patent
Sherman

(10) Patent No.: US 6,405,479 B1
(45) Date of Patent: Jun. 18, 2002

(54) VINE SUPPORT WITH CAM-OVER LOCK CROSS ARM

(75) Inventor: Charles E. Sherman, Milford, MI (US)

(73) Assignee: Volk Enterprises, Inc., Turlock, CA (US)

( * ) Notice: Subject to any disclaimer, the term of this patent is extended or adjusted under 35 U.S.C. 154(b) by 0 days.

(21) Appl. No.: 09/609,681

(22) Filed: Jul. 3, 2000

(51) Int. Cl.⁷ ............................................... A01G 17/08
(52) U.S. Cl. ............................................... 47/46; 47/47
(58) Field of Search ........................... 47/46, 47, 44; 24/129 B; 52/685, 686; 356/57

(56) References Cited

U.S. PATENT DOCUMENTS

| | | | |
|---|---|---|---|
| 278,097 A | * | 5/1883 | Collins ..................... 24/129 B |
| 1,485,924 A | | 3/1924 | Hobbs |
| 1,911,979 A | | 5/1933 | Vaars, Jr. et al. |
| 2,004,983 A | | 6/1935 | Goldbert |
| 3,391,491 A | | 7/1968 | Daly |
| 3,800,365 A | | 4/1974 | Bruggert |
| 4,270,581 A | | 6/1981 | Claxton et al. |
| 4,383,396 A | | 5/1983 | Waugh |
| 4,610,107 A | | 9/1986 | Testa |
| 4,642,940 A | | 2/1987 | Ettema et al. |
| 4,703,584 A | | 11/1987 | Chazalnoel |
| 4,750,293 A | | 6/1988 | Dyke |
| 4,965,961 A | | 10/1990 | Broyles |
| 4,971,282 A | | 11/1990 | Dickinson |
| 5,501,035 A | | 3/1996 | Downer et al. |
| 5,533,239 A | * | 7/1996 | Gall ............................ 24/339 |
| 5,557,883 A | | 9/1996 | Walker |
| 5,916,028 A | | 6/1999 | Downer et al. |

FOREIGN PATENT DOCUMENTS

| | | | | |
|---|---|---|---|---|
| EP | 876756 A1 | * | 11/1998 | .......... A01G/17/08 |
| FR | 2500258 | * | 8/1981 | .......... A01G/17/08 |
| FR | 2743980 | * | 1/1996 | .......... A01G/17/08 |
| WO | 99/25172 | * | 5/1999 | .......... A01G/17/08 |

* cited by examiner

Primary Examiner—Peter M. Poon
Assistant Examiner—Son T. Nguyen
(74) Attorney, Agent, or Firm—Harris Zimmerman, Esq.

(57) ABSTRACT

An assembly for supporting trellis wires on a typical metal post includes a wire clip having opposed trellis wire support arms, each comprised of a portion of the wire extending laterally and including a distal portion bent back over the lateral portion to define an acute angle therewith. A medial portion joining the two wire support arms consists of a V-shaped configuration extending in a lateral plane. The apex of the V shape impinges on one edge of the cross-web of the post, and one leg of the V extends between two fence post spines. A cam over wire lock secures the wire clip to the post, and is comprised of a web having tapered opposed ends. A hole is disposed in one end of the web, and an R-shaped camming slot is formed in a second, opposed end of the wire lock. One end of the trellis wire support clip is passed through the hole in the cam over wire lock, and the wire lock is positioned to extend between the opposed wire support arms. The second end of the wire lock is urged into contact with the wire support clip, the oblique edge of the R-shaped slot acting like a cam surface to draw the wire into the slot against the resilient expansion force of the wire clip. The resilient expansion force of the clip snaps the wire into the arcuate portion of the R shape, capturing the junction portion and securing the assembly to the post.

16 Claims, 3 Drawing Sheets

VINE SUPPORT WITH CAM-OVER LOCK CROSS ARM

BACKGROUND OF THE INVENTION

This invention relates to vineyard trellis systems, and, more particularly, to a vine support system employing trellis wires supported on cross arms.

Growing and harvesting grapes and other similar vine crops tends to involve a great amount of care and labor. In addition to the usual necessities such as water and fertilizer, the vines must be trained on a trellis to support the grapes for proper growth, ripening, and harvesting. In addition, the vines must be pruned regularly and trained to intertwine with the trellis. Establishing a trellis system is a primary requirement for a vineyard, and the time and materials involved in setting up a trellis for each vine involves a large expenditure. Any measure that can reduce the cost of materials and labor in this regard comprises a useful advance over the prior art.

A typical vineyard arranged to be mechanically harvested will be planted so that there will be a plurality of parallel rows with spaced apart grape plants in each row. A trellis system is provided by installing a plurality of vertical posts spaced along each row, usually a post at each plant with an end post at each end of the row. One or more trellis wires are extended along each row, the wires supported by the vertical posts and anchored under tension to the end posts. The vines are grown along the trellis wires, the vines growing in a manner and at a height so that the grapes can be readily harvested therefrom.

One prior art method of attaching the trellis wires to the intermediate wooden posts has been by the use of simple staples. In vineyards that are not mechanically harvested, this is a rapid, inexpensive and effective way to form a trellis system. However, staples have been shown not to withstand the rigors of mechanical harvesting, particularly when the mechanical technique involves shaking the trellis to cause the grapes to fall. Shaking may pull the staples from the posts. Also, wooden stakes may not endure many years of exposure to the elements, and must be replaced periodically.

In recent years more sophisticated trellis systems have been introduced, using metal or plastic posts to carry the trellis wires. The posts may support various types of arms that are screwed or bolted to the posts to engage the trellis wires, or the trellis wires may be secured to the posts by twisted wire arrangements. Although these systems generally have proven to be more sturdy and durable than the older wooden grape stakes, their use typically involves more labor to install the support arms or twisted wire ties. One prior art system, described in U.S. Pat. No. 5,501,035, provides a trellis wire support that engages a standard T-post typically used as a fence post and the like. The trellis wire support extends about three sides of the post, and a wire clip is engaged with the trellis wire support to retain it on the post. The wire clip must be hooked on one side of the trellis wire support, extended to the opposed side, and bent closed to retain the assembly on the post. Although this procedure is not difficult, it requires several manual steps to complete, using pliers or similar tools. Considering the thousands of reiterations of this procedure necessary to complete an installation in a single vineyard, it is apparent that any measure that reduces the manual labor required for installation is economically advantageous.

There is an unmet need in the prior art for a vineyard trellis system that is simple and inexpensive to install while being strong enough to withstand mechanical harvesting and long-term exposure to the elements.

SUMMARY OF THE INVENTION

The present invention generally comprises an assembly for supporting trellis wires on standard metal fence posts or stakes. A salient feature of the assembly is that it requires no tools and very little labor to secure the assembly to the post.

In referring to standard metal fence posts, the typical post includes a T-shaped cross section formed of steel or the like, and a plurality of spines extending from the outer surface of the cross-web that defines the T shape. The spines typically have the form of a truncated triangular solid, and are spaced along the vertical extent of the cross-web.

The trellis wire support assembly of the invention includes a wire clip formed of steel wire or the like that is form-retaining and not bendable by manual effort. The wire clip includes opposed wire support arms, each comprised of a portion of the wire extending laterally and including a distal portion bent back over the lateral portion to define an acute angle therewith. The support arms extend in nominal vertical planes that are in disposed generally in angularly aligned relationship. The distal end of each bent portion is closely spaced to the support post to admit the trellis wire to the acute angle portion, and the trellis wire is captured within the acute angle.

A medial portion joins the two wire support arms. The medial portion consists of a V-shaped configuration extending in a nominal lateral plane. The apex of the V shape impinges on one edge of the cross-web of the post, and one leg of the V extends between two fence post spines.

The trellis wire support assembly further includes a cam over wire lock to secure the wire clip to the post. The cam over wire lock is comprised of a web formed of steel sheet or the like, extending laterally and having tapered opposed ends. In a first end a hole is placed to receive freely one end of the wire clip described above. (Alternatively, an L-shaped slot may be formed to receive the one end of the wire clip.) An R-shaped camming slot is formed in a second, opposed end of the cam over wire lock, and the spacing of the camming slot and the hole is slightly less that the spacing of the trellis wire support arms of the wire clip.

The assembly is installed by placing the trellis wire support clip in contact with the post, the opposed support arms extending upwardly and the V portion of the wire support impinging on one edge of the cross-web of the post, with one leg of the V portion extending between adjacent spines of the post at a desired height above the ground. One end of the trellis wire support clip is then passed through the hole in the cam over wire lock, and the wire lock is positioned to span the distance between the opposed wire support arms. The second end of the wire lock is urged into contact with the wire support clip, approximately at the junction of the wire support arm and the V portion. The oblique edge of the R-shaped slot and the junction portion of the wire clip are urged together by manual force, and the oblique edge acts like a cam surface to draw the junction portion into the slot against the resilient expansion force of the wire clip. When the junction portion fully inserted in the R slot, the resilient expansion force of the clip snaps the junction portion into the arcuate portion of the R shape, capturing the junction portion and securing the assembly to the post. No tools are required to complete this assembly. To remove the assembly, the two wire support arms may be grasped and brought together to release the resilient force on the R slot and permit the junction portion to be removed from the slot. The assembly is then free of the post, and may be removed.

DESCRIPTION OF THE PREFERRED EMBODIMENT

Figure 6:
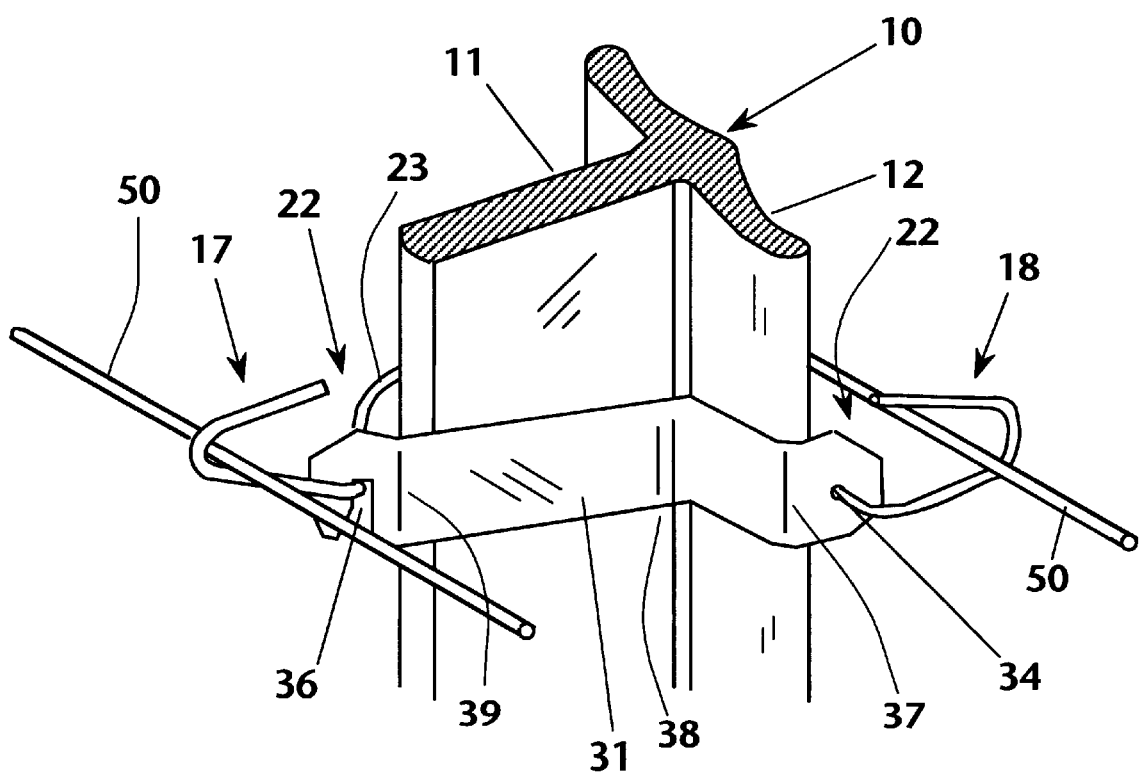
FIG. 6 is a perspective view of the trellis wire support assembly of the invention secured to a typical metal post and supporting typical trellis wires.

The present invention generally comprises an assembly for supporting trellis wires on standard metal fence posts or stakes. With regard to FIGS. 1, 2, and 6, a typical metal post 10 referred to herein may include a central web 11 extending vertically, and a cross-web 12 joined to one edge of the web 11 to define a T-configuration. In a typical post product known in the prior art, the width of the cross-web 12 is approximately the same as the width of the central web 11, and both are formed integrally of steel or material of similar strength. A plurality of spines 13 extend outwardly from the outer surface of the cross-web 12 and are spaced vertically therealong, each spine 13 having the conformation of a truncated, triangular solid.

The trellis wire support assembly of the invention includes a wire clip 16 formed of steel wire or the like that is form-retaining, stiff, and resilient. The wire clip 16 includes opposed trellis wire support arms 17 and 18 that are disposed in planes that are generally transverse to the expected run of the trellis wires. Each trellis wire support arm includes a lateral portion 19 extending outwardly from the post 10, and a distal portion 21 bent from the portion 19 to extend thereabove and define an acute angle therewith. The distal end of portion 21 is spaced apart from the post 10 to define a narrow opening 22 therebetween, through which a trellis wire may be introduced into the acute angle of the arm 17 and/or 18.

The trellis wire support clip 16 further includes a medial portion 23 joining the opposed arms 17 and 18 in an integral structure. The medial portion 23 is comprised of a V-shaped configuration defined by legs 24 and 26 from arms 17 and 18, respectively, to a common vertex 27. The legs 24 and 26 are disposed in a lateral plane that is generally transverse to the planes of the trellis wire support arms 17 and 18. The vertex 27 impinges on an outer edge of the cross-web 12, and the leg 26 extends adjacent to the outer surface of the cross-web 12 and between two spines 13, whereby the position of the assembly on the post 10 is fixed.

Figure 1:
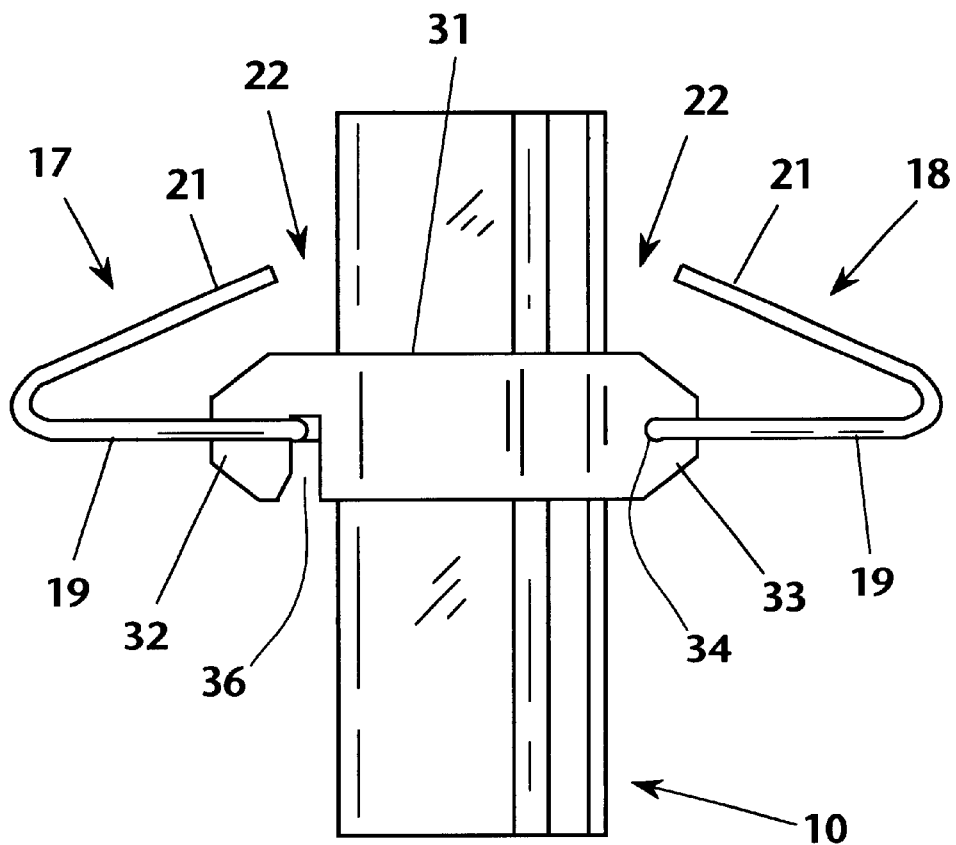
FIG. 1 is a plan elevation of the trellis wire support assembly of the invention secured to a typical metal post.
Figure 2:
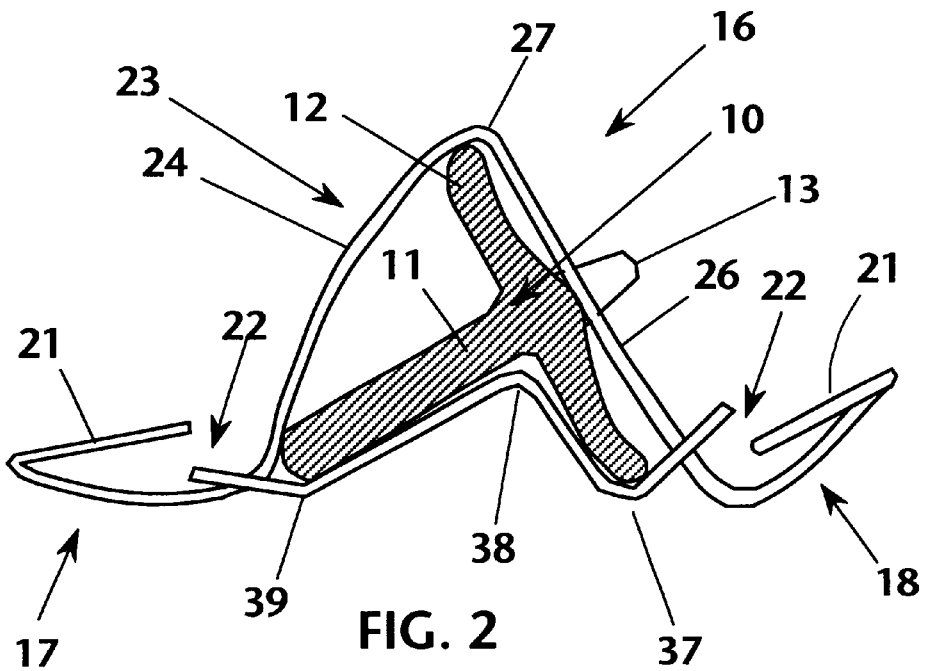
FIG. 2 is a top view of the trellis wire support assembly of the invention secured to a typical metal post, as in FIG. 1.
Figure 3:
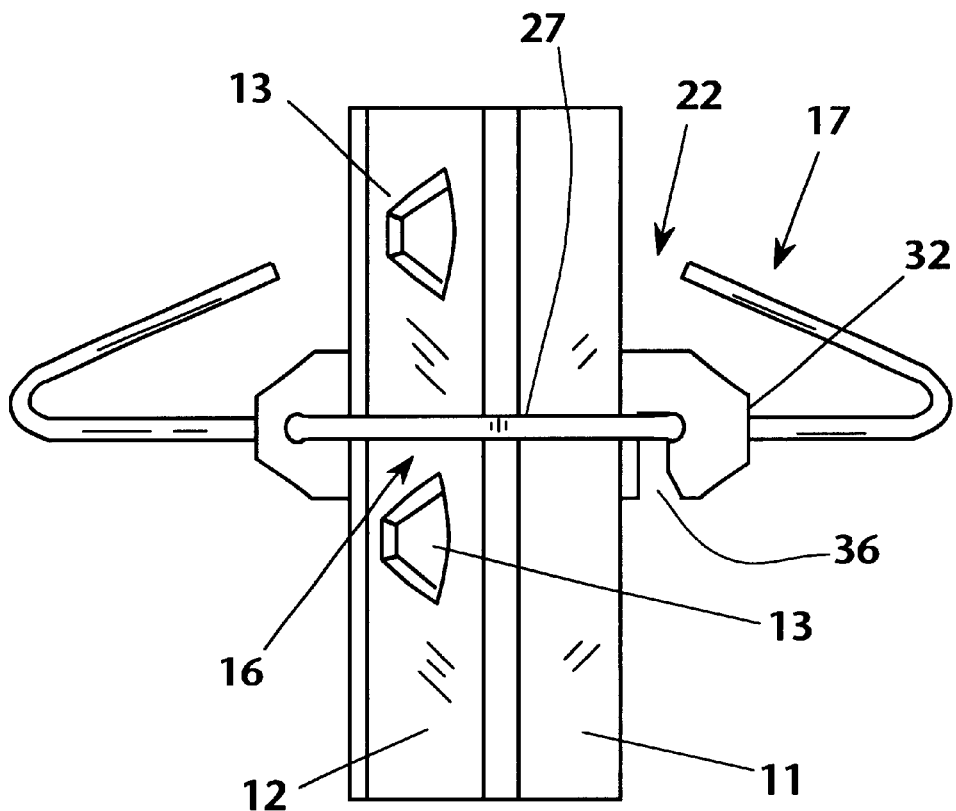
FIG. 3 is a reverse plan view of the trellis wire support assembly secured to a typical metal post.
Figure 4:
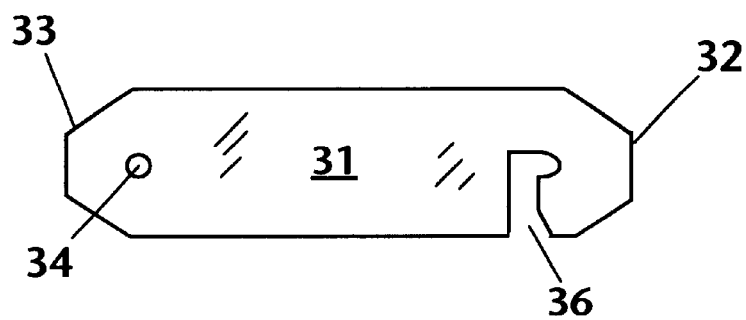
FIG. 4 is a plan view of the cam over wire lock component of the trellis wire support assembly of the invention.

With reference to FIGS. 1, 2, and 4 in particular, the trellis wire support assembly further includes a cam over wire lock 31 to secure the wire clip 16 to the post 10. The cam over wire lock 31 includes a web extending laterally and having tapered opposed ends 32 and 33, and is preferably formed of steel sheet that is form-retaining, stiff, and resilient. A hole 34 is formed adjacent to the end 33, the hole having a diameter sufficient to receive the wire diameter of clip 16 in freely sliding fit. An R-shaped camming slot 36 is formed adjacent to the end 32 of the wire lock, the slot 36 opening in a lower edge of the wire lock 31. The spacing of the hole 33 and the slot 36 is slightly less than the spacing of the junction portions of the wire clip 16 where the support arms 17 and 18 join the medial portion 23.

The cam over wire lock 31 may also be provided with a bend 37 extending generally transversely to the long axis of the member 31 to permit a portion thereof to impinge on an inner surface of the cross-web 12 of the stake 10. Another bend 38 in the member 31 is also generally transverse to the long axis of the member 31 to permit a portion thereof to extend from the web 12 to the outer edge of the web 11. A bend 39 is formed in the member 31 to impinge on the outer edge of the web 11. These plural bends help conform the member 31 to the stake 10.

Figure 5:
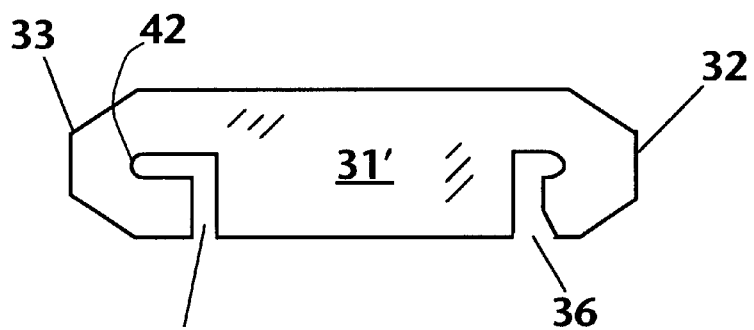
FIG. 5 is a plan view of an alternative embodiment of the cam over wire lock component of the trellis wire support assembly of the invention.

In an alternative embodiment of the cam over lock, designated as reference numeral 31' in FIG. 5, the construction differs only in that the hole 34 is replaced by an L-shaped slot 41 opening to the same edge of the web as the slot 36. The slot 41 is dimensioned to receive the wire diameter of the clip 16 in freely sliding relationship, and the inner extent 42 of the slot 41 is disposed at approximately the same location as the hole 34. The slot 41 enables the end 33 to engage the clip 16 without requiring the wire end of the clip 16 to be inserted through the hole 34.

The trellis wire support assembly is installed on a stake 10 by placing the trellis wire support clip 16 in contact with the post 10, with openings 22 of the opposed support arms 17 and 18 extending upwardly, as shown in FIGS. 1–3 and 5. The leg 26 extends adjacent to the outer surface of the cross-web 12 and between two spines 13 to set the vertical height of the assembly. The wire end of the clip 16 is then inserted through the hole 34 and the wire lock 31 is disposed to span the two support arms with the hole 34 positioned approximately at the junction of the support arm 18 and the medial portion 23. (Alternatively, the junction portion may be inserted into slot 41 and captured in end 43 thereof.)

The end 32 of the wire lock 31 is then urged into contact with the wire clip 16 at approximately the junction of the support arm 17 and the medial portion 23. The oblique edge of the slot 36 and the respective junction portion of the wire clip 16 are urged together by manual force, and the oblique edge acts like a cam surface to draw the junction portion into the slot 36 against the resilient expansion force of the wire clip 16. When the junction portion fully inserted in the R slot 36, the resilient expansion force of the clip snaps the junction portion into the arcuate inner portion of the R shape, capturing the junction portion and securing the assembly to the post. It is significant to note that no pliers or any other tools are required to complete this installation. Likewise, to remove the assembly, the two wire support arms 17 and 18 may be grasped and brought together to release the resilient force on the R slot 36 and permit the junction portion to be removed from the slot 36. The assembly is then free of the post 10, and may be removed.

After the trellis wire support assembly is installed on a post 10, a pair of trellis wires are passed through the openings 22 of the support arms 17 and 18, as shown in FIG. 5. The weight of the wires 50 and the vines supported thereon is borne by the support arms. The gravital force of this weight prevents the spontaneous removal of the wires 50 from the support arms 17 and 18.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A method for securing a trellis wire support assembly to a post, including the steps of:

providing a trellis wire support clip having laterally opposed support arms and a medial portion joining said support arms;

providing a cam over wire lock adapted to span between said support arms and secure the post therebetween;

providing one opening in said wire lock to engage said trellis wire support clip adjacent to one of said support arms;

providing a camming slot in said wire lock to engage said trellis wire support clip adjacent to the other of said support arms;

urging said camming slot to impinge on said trellis wire support clip and resiliently compress said support clip and permit said camming slot to capture said support clip against the resilient restoring force of said support clip.

2. An assembly for supporting trellis wires on a vertical post, including:

a trellis wire support clip, comprised of a pair of laterally opposed support arms, and a medial portion extending between said pair of support arms and formed integrally therewith;

a cam over wire lock, including a laterally extending web having laterally opposed ends, said web having a lateral length sufficient to extend between said pair of support arms;

an opening in said web at one of said opposed ends to receive said wire support clip therethrough, and camming slot means disposed at the other end of said web for engaging said trellis wire support clip, said web spanning said pair of support arms with the vertical post secured therebetween;

said camming slot means including an oblique camming edge for impinging on said wire clip and urging said wire clip into said camming slot means.

3. The assembly for supporting trellis wires of claim 2, wherein said wire clip includes a first junction portion at the conjunction of one of said pair of support arms and said medial portion of said wire clip, and said opening in said web of said wire lock is generally disposed to engage said first junction portion.

4. The assembly for supporting trellis wires of claim 3, wherein said wire clip includes a second junction portion at the conjunction of the other of said pair of support arms and said medial portion of said wire clip, and said camming slot means in said web of said wire lock is generally disposed to engage said second junction portion.

5. The assembly for supporting trellis wires of claim 4, wherein the lateral spacing of said opening and said camming slot means is less than the lateral spacing of said first and second junction portions, and said trellis wire support clip is resiliently compressible to move said first and second junction portions closer together.

6. The assembly for supporting trellis wires of claim 5, wherein said oblique camming edge impinges on said second junction portion and resiliently compresses said second junction portion toward said first junction portion.

7. The assembly for supporting trellis wires of claim 2, wherein said camming slot means includes an inner capture portion for securing said second junction portion.

8. The assembly for supporting trellis wires of claim 7, wherein said camming slot means includes an R-shaped slot having an inner arcuate portion, and said inner arcuate portion thereof comprises said inner capture portion.

9. The assembly for supporting trellis wires of claim 8, wherein said web includes a first bend extending therein generally transversely to the lateral axis of said web, said first bend disposed adjacent to said opening in said web.

10. The assembly for supporting trellis wires of claim 9, wherein said web includes a second bend extending therein generally transversely to the lateral axis of said web, said second bend disposed adjacent to said camming slot means in said web.

11. The assembly for supporting trellis wires of claim 10, wherein said web includes a third bend extending therein generally transversely to the lateral axis of said web, said third bend disposed medially of said first and second bends in said web.

12. The assembly for supporting trellis wires of claim 11, wherein said first and second bends are folded in the same direction to define included angles that overlap, and said third bend is folded in an opposite direction.

13. The assembly for supporting trellis wires of claim 2, wherein said opening comprises a hole disposed adjacent to said one end of said web.

14. The assembly for supporting trellis wires of claim 2, wherein said opening comprises a slot extending into said web from one edge thereof.

15. The assembly for supporting trellis wires of claim 14, wherein said camming slot means includes a camming slot extending into said one edge of said web.

16. The assembly for supporting trellis wires of claim 2, wherein said camming slot means includes an R-shaped slot, said oblique camming edge comprising one portion of said R-shaped slot.

* * * * *